(12) United States Patent
Domingue et al.

(10) Patent No.: US 11,757,244 B2
(45) Date of Patent: Sep. 12, 2023

(54) HIGHER-ORDER DISPERSION COMPENSATING PULSE SHAPER VIA AMPLITUDE SPECTRAL FILTERING AND NONLINEAR PHASE ACCUMULATION

(71) Applicant: Thorlabs, Inc., Newton, NJ (US)

(72) Inventors: Scott R. Domingue, Longmont, CO (US); Matthew S. Kirchner, Westminster, CO (US); Laura Wooldridge, Boulder, CO (US)

(73) Assignee: Thorlabs, Inc., Newton, NJ (US)

( * ) Notice: Subject to any disclaimer, the term of this patent is extended or adjusted under 35 U.S.C. 154(b) by 372 days.

(21) Appl. No.: 16/900,182

(22) Filed: Jun. 12, 2020

(65) Prior Publication Data

US 2020/0395725 A1    Dec. 17, 2020

Related U.S. Application Data

(60) Provisional application No. 62/861,795, filed on Jun. 14, 2019.

(51) Int. Cl.
*H01S 3/00* (2006.01)
*H01S 3/10* (2006.01)

(52) U.S. Cl.
CPC .......... *H01S 3/0057* (2013.01); *H01S 3/0078* (2013.01); *H01S 3/1003* (2013.01)

(58) Field of Classification Search
CPC .... H01S 3/0057; H01S 3/0078; H01S 3/0092; H01S 3/10023; H01S 3/2308; H01S 2301/08
See application file for complete search history.

(56) References Cited

U.S. PATENT DOCUMENTS

| 7,167,300 B2 | 1/2007 | Fermann et al. |
| 8,760,753 B2 | 6/2014 | Limpert et al. |
| 9,899,791 B2 | 2/2018 | Kirchner et al. |

OTHER PUBLICATIONS

Seise et al, Improved performance of nonlinear CPA-systems by spectral clipping, Feb. 2010, Proceedings of SPIE, vol. 7580, 11 , p. 75800X-1-75800X-7. (Year: 2010).*
The European search report and European search opinion issued by the European Patent Office for corresponding European Patent Application No. 20179683.6, dated Nov. 2, 2020.

(Continued)

*Primary Examiner* — Michael Carter
(74) *Attorney, Agent, or Firm* — Myers Wolin, LLC (57) ABSTRACT

A method of pulse shaping using spectral filtering, positive chirp, and self-phase modulation to control the accumulated higher-order phase terms of the spectral phase. This pulse shaping method has particular advantage in fiber chirped pulse amplification (FCPA) systems, where there are two effects: (1) an offsetting of the fourth order phase via nonlinear phase accumulation, allowing for a higher Strehl ratio (i.e., a cleaner pulse), higher peak power pulse and (2) enabling power scaling to higher pulse energies without the increased nonlinear phase accumulation leading to pulse breakup. This technique can be used both in a passive system with no amplification to clean up an existing pulse, and in an amplifier system to enable higher performance operation (shorter pulses, cleaner pulses, higher energy pulses).

13 Claims, 5 Drawing Sheets

(56) References Cited

OTHER PUBLICATIONS

Schimpf, D.N. et al., "Control of the optical Kerr effect in chirped-pulse-amplification systems using model-based phase shaping", Optics Letters, pp. 3788-3790, vol. 34, No. 24, Dec. 15, 2009.

Schimpf, Damian N. et al., "Controlling the influence of SPM in fiber-based chirped-pulse amplification systems by using an actively shaped parabolic spectrum", Optics Express, pp. 16945-16953, vol. 15, No. 25, Dec. 10, 2007, Optical Society of America.

Seise, Enrico et al."Improved performance of nonlinear CPA-systems by spectral clipping", Proceedings of Spie, vol. 7580 No. 75800X-4, Spie, downloaded from https://www.spiedigitallibrary.org/conference-proceedings-of-spie on Oct. 22, 2020.

Backus et al., "High power ultrafast lasers", Review of Scientific Instruments, Mar. 1998, pp. 1207-1223, vol. 69, No. 3, American Institute of Physics.

Chong et al., "Pulse generation without gain-bandwidth limitation in a laser with self-similar evolution", Optics Express, Jun. 18, 2012, pp. 14213-14220, vol. 20, No. 13, Optical Society of America.

Domingue et al., "General theoretical treatment of spectral modulation light-labeling spectroscopy", Journal of the Optical Society of America B, Jun. 2016, pp. 1216-1224, vol. 33, No. 6, Optical Society of America.

Domingue et al., "Nonlinear fiber amplifier with tunable transform limited pulse duration from a few 100 to sub-100-fs at watt-level powers", Optics Letters, Jan. 15, 2014, pp. 359-362, vol. 39, No. 2, Optical Society of America.

Dudley et al. "Supercontinuum generation in photonic crystal fiber", Review of Modern Physics, Oct. 4, 2006, pp. 1135-1184, vol. 78, No. 4.

Martinez, "3000Times Grating Compressor with Positive Group Velocity Dispersion: Application to Fiber Compensation in 1.3-1.6 μm Region", Journal of Quantum Electronics, Jan. 1987, pp. 59-64, vol. QE-23, No. 1, IEEE.

Shah et al., "High energy femtosecond Yb cubicon fiber amplifier", Optics Express, Jun. 13, 2005, pp. 4717-4722, vol. 13, No. 12, Optical Society of America.

* cited by examiner

HIGHER-ORDER DISPERSION COMPENSATING PULSE SHAPER VIA AMPLITUDE SPECTRAL FILTERING AND NONLINEAR PHASE ACCUMULATION

CROSS REFERENCE TO RELATED APPLICATIONS

This application claims the benefit of U.S. Provisional Patent Application No. 62/861,795 filed on Jun. 14, 2019. The disclosures of U.S. Provisional Patent Application 62/861,795 are hereby incorporated by reference.

STATEMENT REGARDING FEDERALLY SPONSORED RESEARCH OR DEVELOPMENT

This invention was made with government support under DOE SBIR No. DE-SC0017200 awarded by the U.S. Department of Energy. The government has certain rights in the invention.

FIELD OF THE INVENTION

The invention generally relates to pulse shaping in ultrashort pulsed laser systems. More particularly, the invention relates to pulse shaping in an ultrashort pulse system using spectral filtering, positive chirp, and self-phase modulation to control the accumulated higher-order terms of the spectral phase. The invention has utility in ultrashort pulse amplification systems in minimizing residual higher-order spectral phase.

BACKGROUND

Figure 1:
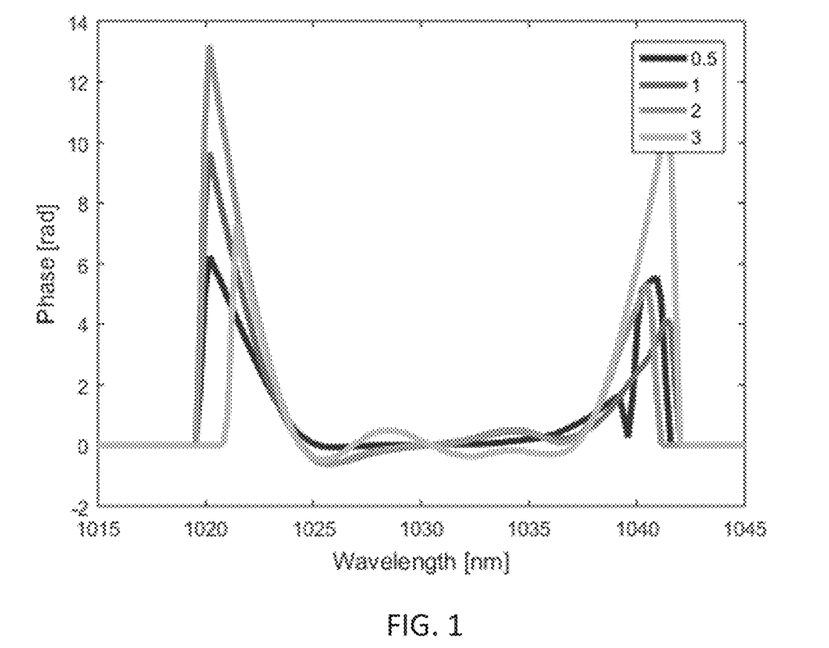
FIG. 1 shows the phase profile of the pulses after amplification for the full unclipped spectrum as output energy is varied from 0.5 to 3 µJ.

In the case of amplifying a smoothly varying spectrum (e.g., Gaussian or hyperbolic secant shape), the nonlinear phase terms in the wings of the spectrum are additive to the inherent fourth and higher order dispersion terms that are a property of all common fiber chirped pulse amplification (FCPA) setups. Thus, uncompensated higher-order dispersion in the recompression of the pulse output introduces undesirable distortion of the final output of the system, and nonlinear effect further add to this distortion. FIG. 1 shows an example data of residual spectral phase of a FCPA system as the magnitude of un-compensated higher-order dispersion increases as the amplified pulse energies are varied. In FIG. 1, the phase profile of the pulses after amplification for the full unclipped spectrum as the output energy is varied from 0.5 to 3 µJ. The higher order phase increases as a function of pulse energy, with mostly-even higher order contributions due to the symmetry of the input pulse. These higher order dispersion terms ultimately limit the bandwidth over which it is possible to amplify a femtosecond pulse with minimal deviation from the power spectrum-dictated Fourier transform limited intensity profile. Furthermore, attempts to avoid the nonlinear distortions by temporally stretching the input pulse further to lower the peak power and thus the nonlinearity (i.e., chirped pulse amplification at larger stretch factors) introduce another limitation, as gain narrowing will limit the output bandwidth leading to an increase in the pulse duration that can be obtained from the laser [1]. Secondarily, even if the spectrum is smoothly shaped to combat gain narrowing and preserve output bandwidth and stretched to a large stretch factor, the system is still limited by the higher order phase terms due to uncompensated material dispersion [1]. This is especially true in a fiber amplifier, where there can be many tens of meters of optical fiber and therefore a significant material dispersion contribution to the total spectral phase. Due to these limitations, most fiber chirped pulse amplification systems operate with a narrower bandwidth and consequently longer pulse width than could in-principle be supported by the gain bandwidth of the amplifier.

Several approaches have been studied that leverage nonlinear phase accumulation to circumvent the physical limitations of a FCPA: amplifier similaritons (also known as parabolic pulse amplification) [2] U.S. Pat. No. 7,167,300 B2, cubicons [3], and dissipative-soliton-like amplification U.S. Pat. No. 9,899,791 (2017). Each of these approaches requires seeding the amplification process with a specific temporal or spectral shaped pulse and then relies on the nonlinear phase generated concurrently with the amplification process.

Therefore, there is a long-felt need for a system and method to amplify an ultrashort pulse without the above mentioned problems or constraints.

SUMMARY

An embodiment of the present invention provides a new method of pulse shaping using spectral filtering, positive chirp, and self-phase modulation to control the accumulated higher-order phase terms of the spectral phase. This pulse shaping method has particular advantage in fiber chirped pulse amplification (FCPA) systems, where there are two effects: (1) an offsetting of the fourth order phase via nonlinear phase accumulation, allowing for a higher temporal Strehl ratio (i.e., a cleaner pulse), higher peak power pulse, and (2) enabling power scaling to higher pulse energies without the increased nonlinear phase accumulation leading to pulse breakup. This technique can be used both in a passive system with no amplification to clean up an existing pulse, and in an amplifier system to enable higher performance operation (shorter pulses, cleaner pulses, higher energy pulses).

One embodiment of the present invention provides a laser device including: a laser source configured to generate a pulse having a duration; a pulse stretcher configured to increase the duration of the pulse; a spectral filter configured to select a frequency range of the pulse; a nonlinear phase component configured to cause a nonlinear phase in the pulse; and a pulse compressor configured to decrease the duration of the pulse; wherein the spectral filtering of the stretched pulse effects a nonlinear phase in the nonlinear phase component that is used to introduce a desirable phase or dispersion to increase the temporal quality of the output pulse.

Another embodiment of the present invention provides a method of shaping a laser pulse spectrum including: providing laser pulse having a duration with a laser source; increasing the duration with a pulse with a pulse stretcher; selecting a frequency range of the pulse with a spectral filter; causing a nonlinear phase in the pulse with a nonlinear phase component; and decreasing the duration of the pulse with a compressor; wherein the spectral filtering of the stretched pulse effects a nonlinear phase in the nonlinear phase component that is used to introduce a desirable phase or dispersion to increase the temporal quality of the output pulse.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Most ultrashort pulse amplifiers, especially fiber amplifiers, are limited in output energy and pulse duration by the linear and nonlinear phase accumulation in the passive components and amplifier components including the gain medium and the gain bandwidth of this medium. Propagating a high energy pulse with a close-to-gaussian input spectrum, with or without amplification, gives high order dispersion in the presence of nonlinear phase accumulation (nonlinear phase shift $>\pi$). In this case, the wings of the spectrum accumulate higher order phase that is not compensated by traditional stretcher/compressor techniques. This higher order phase creates a picosecond background pedestal structure and decreases the peak intensity in the main pulse.

An embodiment of the present invention provides an approach to balance higher-order dispersion with nonlinear phase that can make use of a near-gaussian spectrum, commonly generated by many types of seed laser sources, in combination with chirped pulse amplification (CPA) where a small part of the spectral amplitude in the wings of the spectrum is clipped in the Fourier plane of the stretcher. This creates relatively sharp spectral features in the frequency domain which map to similar features in the time domain when the pulse is stretched in a chirped pulse amplification system. With careful choice of the spectral clip level, the nonlinear higher order terms that occur near the sharp temporal edges are subtractive from the higher order terms of the CPA system in the presence of non-zero nonlinear phase. This setup allows for the tuning of the higher order terms to maximize the peak power and cleanliness of the output pulse.

Figure 2:
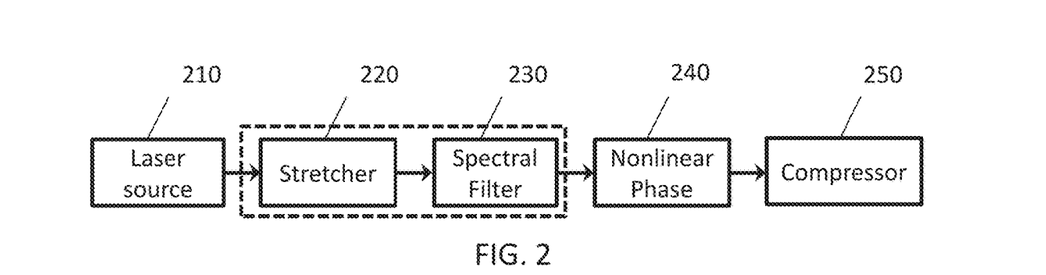
FIG. 2 shows a modified chirped pulse setup with spectral clipping according to an embodiment.
Figure 3:
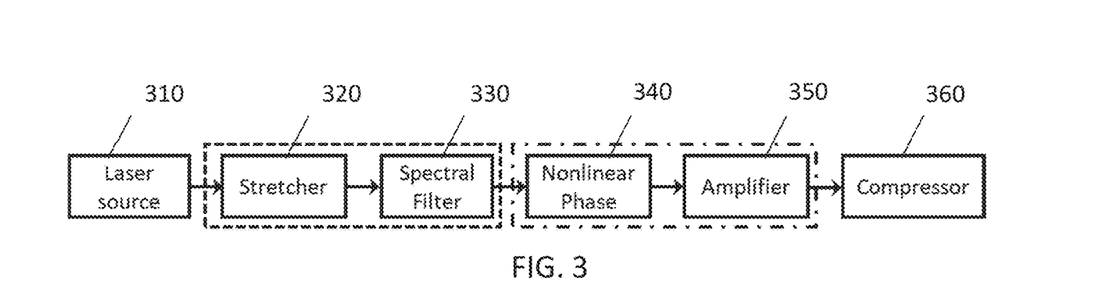
FIG. 3 shows a modified chirped pulse amplification setup with spectral clipping according to an embodiment.

FIG. 2 is a schematic diagram of a modified chirped pulse setup with spectral clipping according to an embodiment. FIG. 3 is a schematic diagram of a modified chirped pulse amplification setup with spectral clipping according to another embodiment. A near-gaussian spectrum is generated by a laser source 210, 310. It is understood that the laser source may include an oscillator seed with or without other optical components such as: a pulse picker, pre-amplifier, nonlinear fiber broadening to a new color, etc. The spectral filtering counteracts the inherent higher order dispersion terms from the CPA and passive-fiber chain. The dashed box denotes that the stretcher 220, 320 and spectral filter 230, 330 can be either sequential or combined in nature without a requirement on the orientation of the two components. The nonlinear phase component 240 can be a passive element (e.g., single mode optical fiber, multimode optical fiber, bulk optical media, a nonlinear optical crystal, etc.) outside of the amplification process (either before or after) or concurrent with the amplifier as denoted by the dashed-dotted box in FIG. 3 around 340 and 350 (e.g., optical fiber doped with Yb, Er, Pr, or Nd etc., or a bulk laser crystal such as Ti-doped sapphire, Yb-doped yttrium aluminum garnet, yttrium lithium fluoride, etc.). A compressor 250, 360 (e.g., a Treacy grating compressor, a prism compressor, or a grism compressor, etc.) recompresses the stretched pulse.

In an embodiment of the present invention, a smooth input spectrum is sent into a stretcher (e.g., grating-based Martinez-type stretcher [4], fiber Bragg grating stretcher, volume holographic stretcher, chirped mirror stretcher, bulk material or fiber stretcher, segmented fiber stretcher or one including gratings and prisms, or grisms, etc.) combined with, followed by, or preceded by a spectral filter. The spectral filter is composed of a binary, discrete, or continuous amplitude mask (e.g., slit in the Fourier plane of a Martinez stretcher, digital spatial light modulator in the Fourier plane of a Martinez, a spatially varying reflective filter in the Fourier plane of a zero-dispersion or other Martinez stretcher, a Lyott filter, or a thin film interference filter). The stretcher is configured to apply positive dispersion sufficient to increase the duration of the pulse by a few 100 times the transform-limited pulse duration, starting with a pulse around 100 fs to a pulse <1 ps in duration. The output intensity profile of the pulse is asymmetric in time, owing to the third order dispersion (TOD) of the stretcher, which is true if the smoothly-varying power spectrum is filtered symmetrically or asymmetrically in the frequency domain—except in the case of a unique spectral filtering condition that exactly offsets the TOD's effect on the pulse intensity profile. An amplifier, or series of amplifiers is used to increase the pulse energy by 60 dB, and the nonlinear phase is managed by choice of fiber size, fiber length, pulse energy, and amplification path to be <50π. The spectral filter is then adjusted to maximize the pulse peak power by changing the spectral positions of the clipping on each side of the spectrum, whereupon an instrument to recover the pulse shape in time could be used to verify and optimize a reduction in the higher order spectral phase terms as well as an improvement in the temporal Strehl ratio (i.e., the peak power of the pulse scaled by the bandwidth limited Fourier transform pulse intensities peak power). Possible pulse characterization methods include second harmonic generation frequency-resolved optical gating (SHG-FROG), other types of FROG, spectral phase interferometry for direct electric-field reconstruction (SPIDER), or dispersion scan (D-scan) measurements, or simpler devices such as a second harmonic auto-correlator. An alternative optimization approach would be to use any of the numerous methods for measuring the peak power of a pulse (autocorrelator, second harmonic efficiency, two photon photodiode, etc.) to optimize the peak power to average power ratio, which also optimizes the cleanliness of a pulse.

Figure 4:
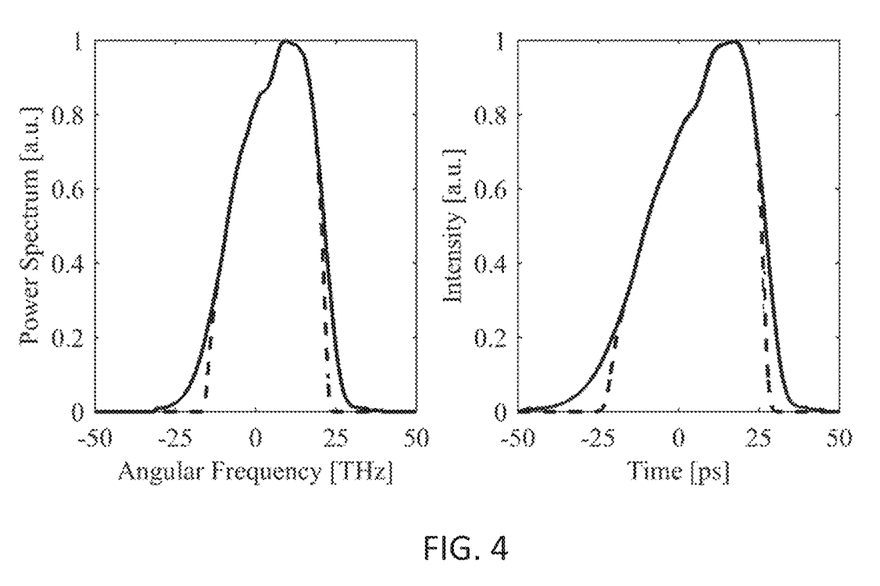
FIG. 4 shows an example of a measured power spectrum supporting a transform-limited pulse of 100 fs and a numerically applied spectral filter and stretcher chirp.

FIG. 4 is an example of a measured power spectrum (solid black) supporting a transform-limited pulse of 100 fs and a numerically applied spectral filter (dashed-lines) and stretcher chirp.

The pulse optimization and enhancement method through spectral filtering in an embodiment of the present invention is specifically different from another spectral filtering method to combat nonlinearities in a CPA (U.S. Pat. No. 8,760,753 B2) wherein the pulse is temporally stretched and spectral filtered to a symmetric pulse in the time domain. In an embodiment of the present invention, there is no requirement for symmetry of the chirped pulse in the time-domain. Secondarily, the present technique is specifically general to nonlinear propagation in both passive optical media and optical media with amplification.

The spectral filtering according to an embodiment of the present invention is also different from a cubicon amplifier [3], wherein the output amplified pulse has a strongly triangular asymmetric profile in the frequency domain. By contrast with cubicons, the embodiment of the present invention produces pulses relatively symmetric in the frequency domain.

In a preferred embodiment of the present invention, a smooth input spectrum is sent into a Martinez stretcher with an adjustable slit in the Fourier plane. The edges of the spectral filter can be adjusted from no clipping (all the colors pass through) to highly clipped (a narrow spectral filter) by adjusting this slit. The stretcher is configured to output tens of picosecond long stretched pulses from a <300 fs input transform-limited spectrum. The output intensity profile of the pulse is asymmetric in time owing to the TOD terms inherent in the stretcher, which is true if the smoothly-varying power spectrum is filtered symmetrically or asymmetrically in the frequency domain (except for the very specific case of asymmetric spectral filtering that balances the stretcher third-order dispersion to realize a symmetric pulse in the time-domain as called for by U.S. Pat. No. 8,760,753 B2).

The stretched pulses are then pre-amplified from 0.02-1 nJ to 10's of nJ for seeding into a power amplifier. A fiber-coupled acousto-optic modulator pulse picker is employed, if necessary, to reduce the seed source repetition rate to the low MHz range for amplification. The power amplifier increases the pulse energy up to 0.1-10's μJ pulse energy levels, and a compressor undoes the stretch to output femtosecond pulses. The amplification is characterized with and without spectral clipping to examine the effects of the nonlinear terms on the phase of the output pulse as well as on the temporal duration and cleanliness of the pulse. A frequency-resolved optical gating (FROG) measurement was used to examine the pulse properties both temporally and spectrally and to compare the amplification with both clipped and un-clipped input spectra.

Figure 5:
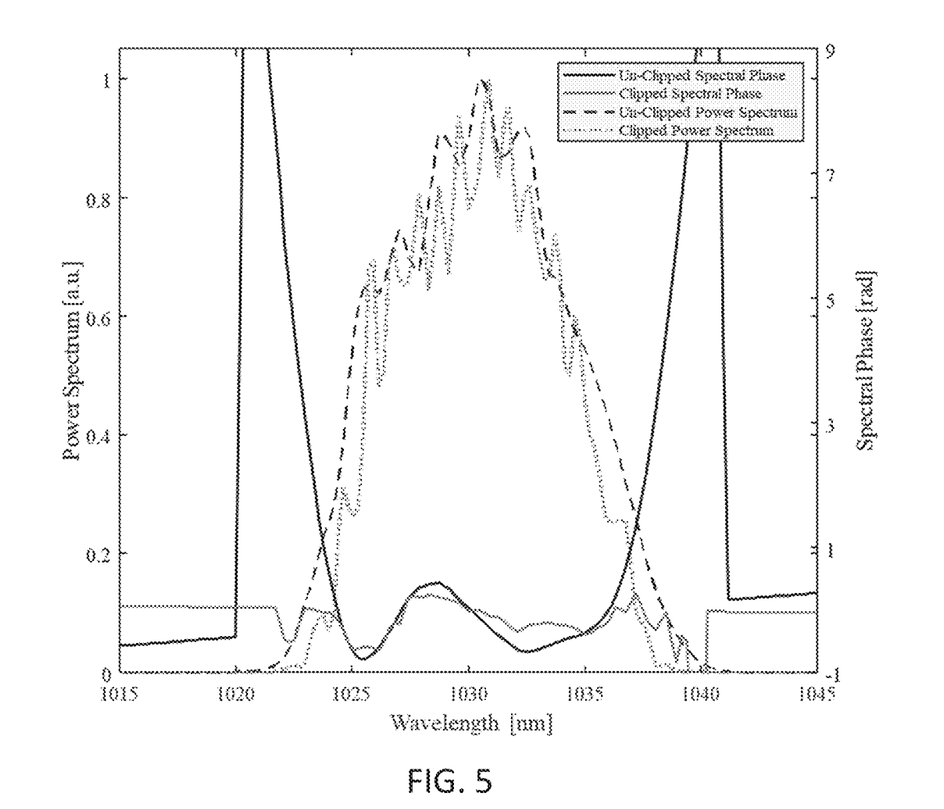
FIG. 5 shows the un-clipped vs clipped output pulse spectral phase.
Figure 6:
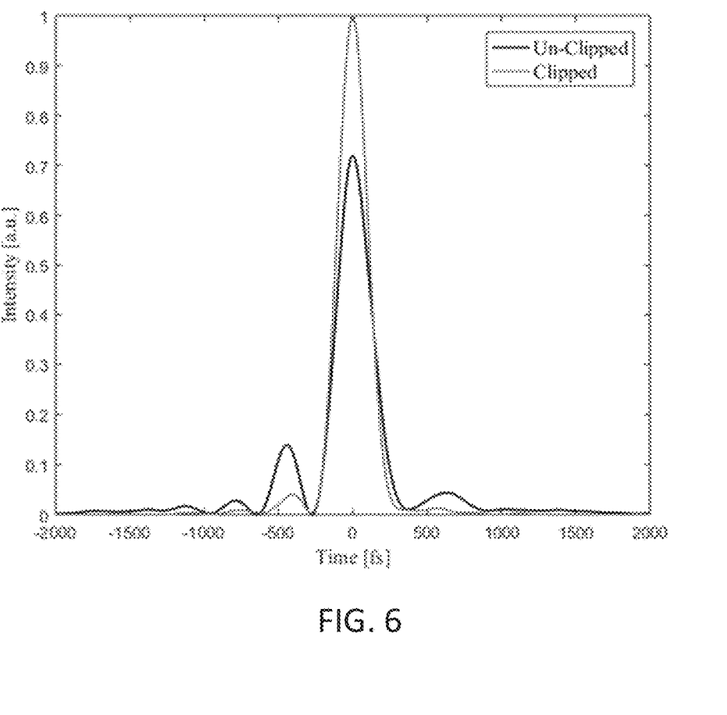
FIG. 6 shows the temporal pulses output at 3 μJ for the un-clipped and clipped input spectra in FIG. 5.

A close comparison of the un-clipped and clipped 3 μJ output pulses appears in FIG. 5 and FIG. 6. In FIG. 5, the graph of un-clipped vs clipped output pulse spectral phase is shown. Both pulses are amplified to 3 μJ and stretched and compressed with the same hardware, except for the clipping hardware. In the clipped spectrum and phase, the higher order phase has been reduced and even changes sign in the wings of the spectrum, indicating the cancellation of detrimental higher order phase. In FIG. 6, the graph of temporal pulses output at 3 μJ for un-clipped and clipped input spectra is shown. The clipped input version has much reduced temporal pedestal (pulse energy outside of the main pulse) and has approximately 30% higher peak power.

There is a clear reduction in the "runaway" (or uncompensated) phase in the wings of the spectrum which allows for a much cleaner output pulse in time. The peak power from the clipped case is approximately 30% higher than when the spectrum is un-clipped, and the pulse in the clipped case is very close to the transform-limited duration (temporal Strehl ratio >90%).

The above case highlights the particular advantage of the pulse shaping method when employed in a FCPA, however it is important to note that the method is not limited to pulse propagation in the presence of amplification. An embodiment of the present invention only requires a spectrally filtered (or clipped) and chirped pulse that accumulates nonlinear phase with propagation (i.e. B-integral). Therefore, it is general to nonlinear phase accumulation in bulk material or in optical propagation through a waveguide (e.g. optical fiber, ridge waveguides, photonic crystal fiber, gas- or liquid-filled hollow-core fiber, gas or liquid filled negative curvature fiber, and gas- or liquid-filled hollow capillaries).

Figure 7:
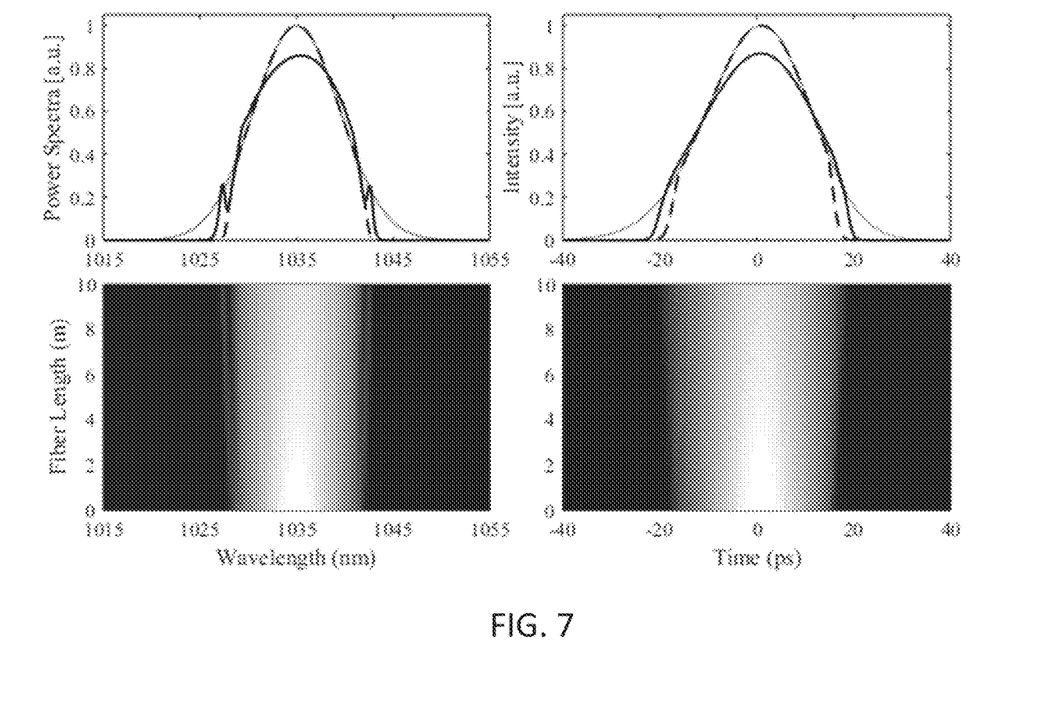
FIG. 7 (TOP) shows a numerically modeled power spectra and temporal intensity of a stretched 150 fs Gaussian pulse (grey), post-spectral filtering (black-dashed), and post nonlinear propagation through 10 m of single mode fiber propagation (black). (BOTTOM) the evolution of the power spectrum and intensity of the stretched and spectrally filtered pulse as a function of fiber length, normalized to the entrance amplitude.

To further establish the basis of this invention, a split-step Fourier method is utilized to numerically model the propagation of stretched and filtered pulses down a length of optical fiber [5]. An example of the propagation through 10 m of optical fiber is shown in FIG. 7. In FIG. 7, the power spectra (top left) and temporal intensity (top right) of a stretched 150 fs Gaussian spectrum (10.5 nm FWHM) oscillator (grey) are shown. In each graph the spectrally filtered spectrum and temporal pulse at the beginning of the fiber (dashed), and the output at the end of the fiber (solid) are shown. Bottom of FIG. 7 are the spectra and intensities of the spectrally filtered and stretched pulse as a function of fiber length, normalized to the entrance amplitude. In this example the oscillator seed pulse at 1035 nm has a transform-limited pulse duration of 150 fs FWHM, is chirped out via a numerically modeled Martinez stretcher to 17 ps. The spectral filter in the Fourier plane of the Martinez stretcher [6] is modeled as a supergaussian of order 20, which is consistent with the filtering effected in the laboratory, with a width of 14.7 nm. This filtering width corresponds to a 1.4× ratio between the spectral filtering width and the spectral width of the pulse. The pulse energy is set to a few 10's of nJ and propagated through 10 m of typical normal-dispersion fused silica optical fiber in the absence of any gain or loss.

Figure 8:
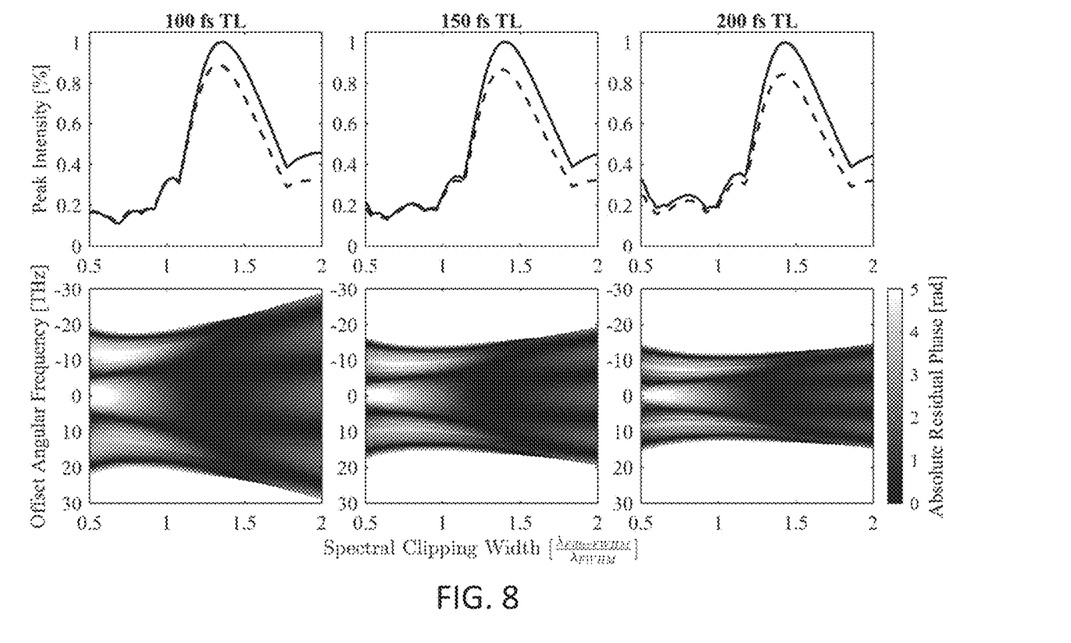
FIG. 8 shows the optimal spectral clipping for the modeled system for different seed pulse transform-limited pulse durations: 100 fs, 150 fs, and 200 fs.

A parametric scan of the seed pulse transform-limited duration and spectral clipping width illustrates the enabling higher-order dispersion compensation of an embodiment of the invention. Shown in FIG. 8 are optimal spectral clipping for the modeled system for different seed pulse transform-limited pulse durations: 100 fs (left), 150 fs (center), and 200 fs (right). The peak intensities (top) are shown as both the Strehl ratio (dashed line) and as normalized to the pulse with maximum peak intensity. The bottom figures are the absolute values of the residual spectral phases as a function of spectral clipping width relative to the seed pulse spectral width after numeric FOD-limited phase compensation via polynomial fitting with a 3rd degree polynomial, where the figure color bar is limited to 5 radians to enhance the visual discrimination of the regions with minimal residual phase.

In this case study, the stretched pulse duration was set to be 25 ps FWHM for all three examined seed pulse FWHM transform-limited durations of 100, 150, and 200 fs. The output pulses from the model are numerically compressed in a third order dispersion limited manner, which is a reasonable approximation of a real system with appropriately chosen mis-matched grating densities in the stretcher and compressor [1] combined with transverse tuning of the focusing lens [7] and grating angle tuning of the Martinez [1]. The pulse intensities are therefore characterized as fourth-order dispersion (FOD) limited.

Figure 9:
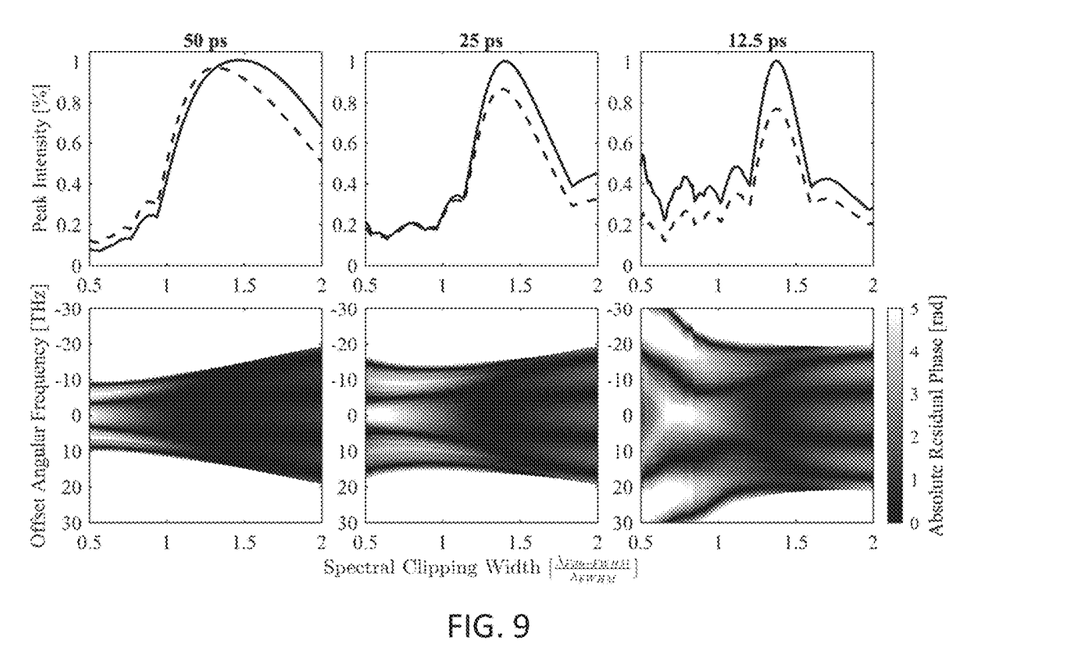
FIG. 9 shows the optimal spectral clipping for the modeled system for 150 fs FWHM transform-limited seed pulse durations stretched to 50 fs, 25 fs, and 12.5 fs.

For each fundamental pulse duration, there exists an optimal spectral clipping width that induces a nonlinear phase that compensates for the linear higher-order dispersion of the system (material dispersion from the fiber and bulk optics, dielectric coatings, stretcher, compressor, and gain media). To highlight that the effect is general, a second case study has been performed, where the seed pulse transform-limited duration is fixed at 150 fs FWHM and the chirp is varied to produce stretched pulse durations of 50, 25, and 12.5 ps FWHM. FIG. 9 shows the optimal spectral clipping for the modeled system for 150 fs FWHM transform-limited seed pulse durations stretched to 50 ps (left), 25 ps (center), and 12.5 ps (right). The peak intensities (top) are shown as both the temporal Strehl ratio (dashed line) and as normalized to the pulse with maximum peak intensity. The bottom figures are the absolute values of the residual spectral phases as a function of spectral clipping width relative to the seed pulse spectral width after numeric FOD-limited phase compensation via polynomial fitting with a 3rd degree polynomial, where the figure color bar is limited to 5 radians to enhance the visual discrimination of the regions with minimal residual phase.

In both cases, varied seed pulse duration with fixed stretched duration and fixed seed pulse duration with varied stretch, there exists an optimal filtering width ratio (spectral filter width relative to the seed spectral width FWHM) around 1.4×.

Figure 10:
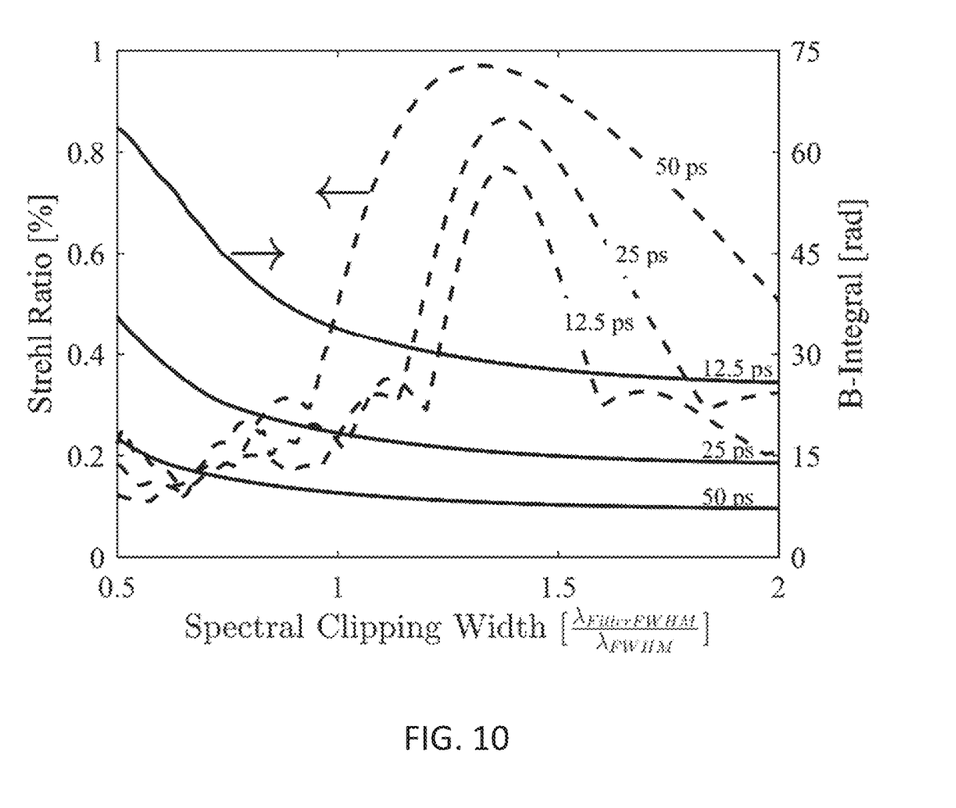
FIG. 10 shows temporal Strehl ratio and B-integral for a 150 fs seed pulse transform-limited duration stretched to 50, 25, and 12.5 ps with varied spectral clipping width ratio.

While the optimum spectral filtering width as shown in FIGS. 8 and 9 is fairly consistently found to be around 1.4×, it has been found that the range of spectral filtering widths is highly dependent on the B-integral [1]. The B-integral across both cases shown here, is dependent on the peak intensity of the stretched pulse, thus the similarity in Strehl ratio curves observed in FIG. 7 compared to FIG. 8. Taking the second case as an example (fixed seed pulse duration of 150 fs FWHM and varied stretched pulse durations of 50, 25, and 12.5 ps), FIG. 10 shows the Strehl ratio of the numerically de-chirped, FOD-limited pulse intensities compared to the B-Integral accumulated for varied spectral filtering width ratios. The breadth or range of spectral filtering width ratios producing high Strehl ratio pules (>80%) is much broader for pulses accumulating less B-integral (i.e. high stretch factors). However, even in the middle case, 150 fs seed pulse stretched to 25 ps, the peak is suitably broad (2 nm width at 80% Strehl ratio) for easy realization in an optical system. And while higher B-integral systems produce narrower operating ranges (and reduced Strehl ratios), it has been shown that the optimal spectral filtering produces higher peak intensities than un-filtered seed pulses up to B-integrals as high as 30 radians.

Lastly, and perhaps most importantly, the spectral filtering plus nonlinear phase accumulation (equivalently B-integral) achieves larger peak intensities than a pseudo-linear system, as evidenced by the fall-off in Strehl for the 150 fs seed pulse stretched to 50 ps for increasingly large spectral filtering width ratios (i.e., diminished perturbations to the seed pulse power spectrum). This improvement is quite strong, constituting a more than a 20% increase in peak intensity. The cause for this differentiation is the compensation for the material higher-order dispersion via the nonlinear phase induced by the spectrally filtered and stretched pulses. The impact of this differentiation is most significant when combined with a FCPA (or CPA) system, where the FCPA system absent the spectral filtering will always be limited by material dispersion for pulse durations <300 fs. The pulse shaping method according to an embodiment of the present invention enables the compensation of the FCPA output pulse to beyond fourth-order limited dispersion compensation, as shown in FIGS. 5 and 6.

The novel pulse shaping method according to an embodiment of the present invention provides a way to tune the higher order phase of a passive, amplified, or combination type optical system via a combination of spectral filtering (or clipping), temporal stretch, and nonlinear phase accumulation. The pulse shaping method according to an embodiment of the present invention works across a range of seed pulse transform-limited durations (<300 fs), stretch factors, and B-integrals (5-30 radians). Additionally, this pulse shaping method yields shorter, cleaner pulses in the presence of non-zero B-integral than possible from a similar CPA embodiment with zero B-integral in the presence of higher-order spectral phase, such as the material dispersion contribution to a typical FCPA. This method improves the realizable pulse quality and duration at energy levels applicable to biological imaging, biological material modification, laser ablation, micromachining, frequency conversion, and harmonic generation.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

REFERENCES

[1] S. Backus, C. G. Durfee, M. M. Murnane, and H. C. Kapteyn, "High power ultrafast lasers," Rev. Sci. Instrum., vol. 69, no. 3, p. 1207, 1998.
[2] A. Chong et al., "Pulse generation without gain-bandwidth limitation in a laser with self-similar evolution," Opt. Express, vol. 20, no. 13, pp. 14213-20, June 2012.
[3] L. Shah, Z. Liu, I. Hartl, G. Imeshev, G. Cho, and M. Fermann, "High energy femtosecond Yb cubicon fiber amplifier," Opt. Express, vol. 13, no. 12, pp. 4717-22, June 2005.
[4] O. Martinez, "3000 times grating compressor with positive group velocity dispersion: Application to fiber compensation in 1.3-1.6 μm region," IEEE J. Quantum Electron, vol. 23, no. 1, pp. 59-64, 1987.
[5] J. M. Dudley and S. Coen, "Supercontinuum generation in photonic crystal fiber," Rev. Mod. Phys., vol. 78, no. 4, pp. 1135-1184, October 2006.
[6] S. R. Domingue and R. a. Bartels, "General theoretical treatment of spectral modulation light-labeling spectroscopy," J. Opt. Soc. Am. B, vol. 33, no. 6, p. 1216, 2016.
[7] S. R. Domingue and R. A. Bartels, "Nonlinear fiber amplifier with tunable transform limited pulse duration from a few 100 to sub-100-fs at watt-level powers," Opt. Lett., vol. 39, no. 2, pp. 359-62, January 2014.

The invention claimed is:

1. A laser device comprising:
   a laser source configured to generate a pulse having a duration;
   a pulse stretcher configured to increase the duration of the pulse;
   a spectral filter configured to select a frequency range of the pulse;
   a nonlinear phase component configured to cause a nonlinear phase in the pulse; and
   a pulse compressor configured to decrease the duration of the pulse;
   wherein the frequency range is selected such that the spectral filtering of the stretched pulse effects a nonlinear phase through propagation in the nonlinear phase component that is used to introduce a desirable phase or dispersion to offset higher-order dispersion terms of the laser pulse in the presence of nonlinear phase accumulation so as to increase the temporal Strehl ratio and peak power of the output pulse.

2. The laser device of claim 1, wherein the spectral filter is tunable to enable tuning of the nonlinear phase effect.

3. The laser device of claim 1, further comprising an amplifier before the compressor to increase a power or energy of the output pulse.

4. The laser device of claim 3, wherein the amplifier provides some or all of the nonlinear phase.

5. The laser device of claim 1, wherein the laser source is configured to generate the pulse with a near-gaussian spectrum.

6. The laser device of claim 1, wherein the pulse stretcher is configured to apply a positive dispersion sufficient to increase the duration of the pulse by at least 10 times the transform-limited pulse duration.

7. The laser device of claim 1, wherein the spectral filter is configured to maximize the pulse peak power by independently changing the spectral positions of the clipping on each side of the spectrum of the pulse.

8. The laser device of claim 1, wherein the nonlinear phase accumulation is <50 π.

9. A method of shaping a laser pulse spectrum comprising:
   generating a pulse having a duration with a laser source;
   increasing the duration with a pulse with a pulse stretcher;
   selecting a frequency range of the pulse with a spectral filter;
   causing a nonlinear phase in the pulse with a nonlinear phase component; and
   decreasing the duration of the pulse with a compressor;
   wherein the frequency range is selected such that the spectral filtering of the stretched pulse effects a nonlinear phase through propagation the nonlinear phase component that is used to introduce a desirable phase or dispersion to offset higher-order dispersion terms of the laser pulse in the presence of nonlinear phase accumulation so as to increase the temporal Strehl ratio and peak power of the output pulse.

10. The method of claim 9, further comprising tuning the spectral filter to adjust the nonlinear phase effect.

11. The method of claim 9, further comprising amplifying before decreasing the duration of the pulse to increase a power or energy of the output pulse.

12. The method of claim 9, further comprising configuring the spectral filter to maximize the pulse peak power by independently changing the spectral positions of the clipping on each side of the spectrum of the pulse.

13. The method of claim 9, further comprising managing the nonlinear phase by optimizing one or more of: fiber size, fiber length, pulse energy, or an amplification element before the compressor element.

* * * * *